(12) United States Patent
Salokannel et al.

(10) Patent No.: US 7,499,674 B2
(45) Date of Patent: Mar. 3, 2009

(54) METHOD AND SYSTEM FOR REPEAT REQUEST IN HYBRID ULTRA WIDEBAND-BLUETOOTH RADIO

(75) Inventors: Juha Salokannel, Kangasala (FI); Harald Kaaja, Helsinki (FI); Arto Palin, Viiala (FI); Markku A. Oksanen, Helsinki (FI)

(73) Assignee: Nokia Corporation, Espoo (FI)

( * ) Notice: Subject to any disclaimer, the term of this patent is extended or adjusted under 35 U.S.C. 154(b) by 1175 days.

(21) Appl. No.: 10/660,549

(22) Filed: Sep. 12, 2003

(65) Prior Publication Data

US 2005/0058107 A1   Mar. 17, 2005

(51) Int. Cl.
- H04B 1/00 (2006.01)
- H04B 7/00 (2006.01)
- H04B 14/06 (2006.01)
- H04M 1/00 (2006.01)
- H04Q 7/20 (2006.01)
- H04Q 7/00 (2006.01)

(52) U.S. Cl. .......... 455/69; 455/426.1; 455/553.1; 370/332; 375/252

(58) Field of Classification Search .......... 455/69, 455/126, 24, 423, 552.1, 553.1, 426.1, 426.2; 375/252, 358; 370/332; 714/18, 48, 748
See application file for complete search history.

(56) References Cited

U.S. PATENT DOCUMENTS

| | | | |
|---|---|---|---|
| 5,307,370 A | 4/1994 | Eness | |
| 5,677,927 A | 10/1997 | Fullerton et al. | 375/200 |
| 5,687,169 A | 11/1997 | Fullerton | 370/324 |
| 6,021,516 A * | 2/2000 | Okajima et al. | 714/748 |
| 6,144,464 A | 11/2000 | Rupp et al. | |
| 6,172,673 B1 | 1/2001 | Lehtinen et al. | |
| 6,349,199 B1 | 2/2002 | Armantrout | |
| 6,507,734 B1 | 1/2003 | Berger et al. | |
| 6,539,503 B1 | 3/2003 | Walker | |
| 6,549,567 B1 * | 4/2003 | Fullerton | 375/219 |
| 6,556,825 B1 | 4/2003 | Mansfield | |
| 6,571,089 B1 | 5/2003 | Richards et al. | 455/266 |
| 6,571,212 B1 | 5/2003 | Dent | |

(Continued)

FOREIGN PATENT DOCUMENTS

CA   2443871 A1   2/2003

(Continued)

OTHER PUBLICATIONS

Walter Hirt, "Ultra-wideband radio technology: overview and future research", Computer Communications, Amsterdam, NL, vol. 26, No. 1, Feb. 2003, pp. 46-52.

(Continued)

*Primary Examiner*—Nay A. Maung
*Assistant Examiner*—Andrew Wendell
(74) *Attorney, Agent, or Firm*—Morgan & Finnegan LLP

(57) ABSTRACT

A method and system improves data throughput when performing error control in Ultra Wideband (UWB) communications. The method and system is capable of performing communications via a first wireless communications link and a second wireless communications link. The first wireless communications link is a UWB transmission link and the second wireless communications link is a different type of wireless communications link for communicating error control data for the UWB transmission link.

52 Claims, 10 Drawing Sheets

U.S. PATENT DOCUMENTS

| | | | |
|---|---|---|---|
| 6,587,949 B1 | 7/2003 | Steinberg | 713/193 |
| 6,636,749 B2 | 10/2003 | Holmes et al. | |
| 6,799,287 B1 | 9/2004 | Sharma et al. | |
| 6,915,119 B1 | 7/2005 | Konishi | |
| 6,941,132 B2 | 9/2005 | Van Lieshout et al. | |
| 6,957,086 B2 | 10/2005 | Bahl et al. | |
| 6,959,199 B2* | 10/2005 | Ohkubo et al. | 455/522 |
| 6,961,541 B2 | 11/2005 | Overy et al. | |
| 6,993,343 B2* | 1/2006 | Yoshii et al. | 455/452.1 |
| 7,010,320 B2* | 3/2006 | Komatsu | 455/522 |
| 7,046,716 B1 | 5/2006 | Miao | |
| 7,058,071 B1 | 6/2006 | Myles et al. | |
| 7,088,795 B1 | 8/2006 | Aiello et al. | |
| 7,096,033 B1 | 8/2006 | Bell | |
| 7,103,314 B2 | 9/2006 | Li | |
| 7,135,985 B2 | 11/2006 | Woolgar et al. | |
| 7,269,774 B2* | 9/2007 | Sudo | 714/748 |
| 2001/0007815 A1 | 7/2001 | Philipsson | |
| 2001/0049262 A1 | 12/2001 | Lehtonen | 455/41 |
| 2001/0055356 A1 | 12/2001 | Davies | |
| 2002/0003792 A1 | 1/2002 | Schmidl et al. | |
| 2002/0065099 A1 | 5/2002 | Bjorndahl | |
| 2002/0073269 A1 | 6/2002 | Kawashima et al. | 711/100 |
| 2002/0080866 A1 | 6/2002 | Bouet et al. | |
| 2002/0136268 A1 | 9/2002 | Gan et al. | |
| 2002/0151276 A1 | 10/2002 | Ito | |
| 2002/0164997 A1 | 11/2002 | Parry | |
| 2003/0032422 A1* | 2/2003 | Wynbeek | 455/422 |
| 2003/0035423 A1* | 2/2003 | Beckmann et al. | 370/390 |
| 2003/0063196 A1 | 4/2003 | Palatov et al. | 348/211.2 |
| 2003/0078037 A1 | 4/2003 | Auckland et al. | |
| 2003/0100288 A1 | 5/2003 | Tomlinson, Jr. et al. | |
| 2003/0108010 A1 | 6/2003 | Kim et al. | |
| 2003/0137966 A1 | 7/2003 | Odman et al. | |
| 2003/0147453 A1 | 8/2003 | Batra | |
| 2003/0148767 A1 | 8/2003 | Sugaya et al. | |
| 2003/0156589 A1 | 8/2003 | Suetsugu | |
| 2003/0174048 A1 | 9/2003 | McCorkle | |
| 2003/0203741 A1 | 10/2003 | Matsuo et al. | |
| 2003/0232620 A1* | 12/2003 | Runkle et al. | 455/423 |
| 2004/0008617 A1* | 1/2004 | Dabak et al. | 370/208 |
| 2004/0066762 A1 | 4/2004 | Alastalo | |
| 2004/0147223 A1 | 7/2004 | Cho | |
| 2004/0151109 A1* | 8/2004 | Batra et al. | 370/208 |
| 2004/0204076 A1* | 10/2004 | Kotzin | 455/557 |
| 2004/0214568 A1 | 10/2004 | Anderson | |
| 2004/0219897 A1* | 11/2004 | Choi | 455/166.2 |
| 2004/0235468 A1 | 11/2004 | Luebke et al. | |
| 2005/0031051 A1 | 2/2005 | Rosen et al. | |
| 2005/0037775 A1 | 2/2005 | Moeglein et al. | |
| 2005/0058116 A1 | 3/2005 | Palin et al. | |
| 2005/0078598 A1* | 4/2005 | Batra et al. | 370/206 |
| 2005/0097408 A1 | 5/2005 | Palin et al. | |
| 2005/0099943 A1 | 5/2005 | Naghian et al. | |
| 2005/0193309 A1* | 9/2005 | Grilli et al. | 714/752 |
| 2005/0266808 A1 | 12/2005 | Reunamaki et al. | |
| 2005/0283207 A1* | 12/2005 | Hochmair et al. | 607/55 |
| 2006/0036922 A1* | 2/2006 | Hong et al. | 714/748 |
| 2007/0083922 A1* | 4/2007 | Reiner | 726/12 |

FOREIGN PATENT DOCUMENTS

| | | |
|---|---|---|
| CN | 1496020 A | 5/2004 |
| DE | 10140446 A1 | 3/2003 |
| EP | 1 185 033 A1 | 3/2002 |
| EP | 1274194 A1 | 1/2003 |
| EP | 1 389 855 A2 | 2/2004 |
| EP | 1515473 A2 | 3/2005 |
| EP | 0 999 717 A2 | 5/2005 |
| EP | 1387530 A1 | 2/2006 |
| GB | 2 287 383 | 9/1995 |
| KR | 2003-10658 | 2/2003 |
| KR | 2003-17987 | 3/2003 |
| WO | 99/38302 | 7/1999 |
| WO | WO 99/38302 | 7/1999 |
| WO | 99/41876 | 8/1999 |
| WO | WO 99/41876 | 8/1999 |
| WO | 01/45319 | 6/2001 |
| WO | WO 01/45319 | 6/2001 |
| WO | WO 02/21746 A2 | 3/2002 |
| WO | 02/082291 | 10/2002 |
| WO | 03/024036 A1 | 3/2003 |
| WO | WO 03/084146 A1 | 9/2003 |
| WO | 03/081846 A1 | 10/2003 |

OTHER PUBLICATIONS

The Bluetooth Special Interest Group, Specification of The Bluetooth System, vol. 1 & Vol. 2, Core and Profiles: Version 1.1, Feb. 22, 2001.

O'Donnell et al., "An Integrated, Low Power, Ultra-Wideband Transceiver Architecture for Low-Rate, Indoor Wireless Systems", Dept. of Electrical Engineering & Computer Science, University of California, Berkeley, Berkeley, CA, 8 pgs.

P. I. I. Withington, et al., "An Impulse Radio Communication System", "Proceedings of the International Conference on Ultra-Wideband, Short Pulse Electromagnetics", (ISBN 0-306-44530-1), Oct. 19, 1992, pp. 113-200.

J. Bray and C. Sterman, "Bluetooth 1.1-Connect Without Cables", Prentice Hall Inc., Upper Saddle River, NJ 1002 (ISBN 0-13-066106-6), Sects. 5.4., pp. 70-78.

D. J. Costello, Jr., et al., "Applications of Error-Control Coding", IEEE Transactions of Information Theory, Oct. 1998, vol. 44, pp. 2531-2560.

U.S. Appl. No. 10/660,634, filed Sep. 12, 2003, M. Oksanen et al.
U.S. Appl. No. 10/660,545, filed Sep. 12, 2003, A. Palin et al.
U.S. Appl. No. 10/660,544, filed Sep. 12, 2003, A. Palin et al.
U.S. Appl. No. 10/870,060, filed Jun. 18, 2004, Kossi et al.
English translation of Chinese Office Action dated Apr. 4, 2008.
Korean Search Report for Korean Application No. 10-2006-7026567, Jul. 30, 2008.

* cited by examiner

DATA PACKET 600

| INFO FIELD (Number of data fields, length of data fields, length of the last data field, continuation bit(s), block number (BN)) + CRC | | | |
|---|---|---|---|
| SN | DATA (field) | CRC | SN | DATA (field) | CRC |
| SN | DATA (field) | CRC | SN | DATA (field) | CRC |
| SN | DATA (field) | CRC | SN | DATA (field) | CRC |
| SN | DATA (field) | CRC | SN | DATA (field) | CRC |

FIG. 6

METHOD AND SYSTEM FOR REPEAT REQUEST IN HYBRID ULTRA WIDEBAND-BLUETOOTH RADIO

RELATED APPLICATIONS (1) U.S. patent application Ser. No. 10/660,544, entitled "Method And System For Establishing A Wireless Communications Link", filed contemporaneously with the present application and fully incorporated herein by reference.

(2) U.S. patent application Ser. No. 10/660,545, entitled "Method And System For Processing Acknowledgments In A Wireless Communications Network", filed contemporaneously with the present invention and fully incorporated herein by reference.

(3) U.S. patent application Ser. No. 10/660,634, entitled "Ultra-Wideband/Low Power Communication Having A Dedicated Memory Stick For Fast Data Downloads—Systems, Methods And Program Products", filed contemporaneously with the present application and fully incorporated herein by reference.

BACKGROUND

1. Technical Field

The present invention relates to wireless communications. More particularly, the present invention relates to techniques for performing data transmission and error control employing separate communications links.

2. Art Background

Since gaining approval by the Federal Communications Commission (FCC) in 2002, ultra wideband (UWB) techniques have become an attractive solution for short-range wireless communications because they allow for devices to exchange information at relatively high data rates.

Although UWB systems for short-range networks are relatively new, their transmission techniques have been known for decades. In fact, the first radio transmission was made by a UWB technique when Heinrich Hertz discovered radio waves in 1887. This discovery was made with a spark gap transmitter, which can be viewed as an early UWB radio. Later on, such transmitters were banned because they emitted wide spectrum transmissions.

Current FCC regulations permit UWB transmissions for communications purposes in the frequency band between 3.1 and 10.6 GHz. However, for such transmissions, the spectral density has to be under −41.3 dBm/MHz and the utilized bandwidth has to be higher than 500 MHz.

There are many UWB transmission techniques that can fulfill these requirements. A common and practical UWB technique is called impulse radio (IR). In IR, data is transmitted by employing short baseband pulses that are separated in time by gaps. Thus, IR does not use a carrier signal. These gaps makes IR much more immune to multipath propagation problems than conventional continuous wave radios. RF gating is a particular type of IR in which the impulse is a gated RF pulse. This gated pulse is a sine wave masked in the time domain with a certain pulse shape.

IR transmission facilitates a relatively simple transmitter design, which basically requires a pulse generator and an antenna. This design does not necessarily require a power amplifier, because transmission power requirements are low. In addition, this design does not generally require modulation components such as voltage controlled oscillators (VCOs) and mixers, because the impulses are baseband signals.

In general, IR receiver designs are more complex than their corresponding transmitter designs. However, these designs are much simpler than conventional receiver designs because they typically do not employ intermediate frequency (IF) signals or filters. However, to fulfill spectral requirements, IR impulses have to be very short in duration (e.g., a couple of nanoseconds). This requirement places stringent timing demands on receiver timing accuracy. The fulfillment of these demands can also provide IR receivers with accurate time resolution and positioning capabilities.

Although UWB offers high transmission rate over a wireless medium, the reliability of such data transfer is at issue as with other transmission approaches. Thus, it is desirable to provide an error control scheme or mechanism, such as an Automatic Repeat reQuest (ARQ) mechanism, to ensure reliable data transfer. However, such an approach would entail implementation of separate ARQ messages which utilize the same UWB radio and would thus reduce the available bit rate. Since UWB employs low $T_X$ power, the occurrence of transmission errors may also be common which may result in numerous retransmissions.

Existing FCC regulations require that a UWB capable device may only transmit UWB signals when it is associated with a receiver. Strictly interpreted, these regulations prohibit devices from sending UWB transmissions for the purpose of setting up a UWB connection. Thus, devices may need to use alternate transmission techniques to exchange information and parameters necessary to establish a UWB link.

Other short-range networks exist but do not provide the high data rates offered by UWB. One such network is Bluetooth. Bluetooth defines a short-range radio network, originally intended as a cable replacement. It can be used to create ad hoc networks of up to eight devices, where one device is referred to as a master device. The other devices are referred to as slave devices. The slave devices can communicate with the master device and with each other via the master device. The Bluetooth Special Interest Group, *Specification Of The Bluetooth System*, Volumes 1 and 2, Core and Profiles: Version 1.1, Feb. 22, 2001, describes the principles of Bluetooth device operation and communication protocols. This document is incorporated herein by reference in its entirety. The devices operate in the 2.4 GHz radio band reserved for general use by Industrial, Scientific, and Medical (ISM) applications. Bluetooth devices are designed to find other Bluetooth devices within their communications range and to discover what services they offer.

SUMMARY

A method and system is provided to improve data throughput when performing error control in Ultra Wideband (UWB). The method and system is capable of establishing and performing communications via a first communications link and a second communications link. The first wireless communications link is a UWB transmission link and the second wireless communications link is a different type of wireless communications link for communicating error control data for the UWB transmission link.

The error control data may be Automatic Repeat Request (ARQ) data. The ARQ data may include Acknowledgement (ACK) data identifying a packet type, block number, sequence numbers and number of sequence numbers.

The UWB data transmission may be divided into at least one block. The block may include at least one data field including a sequence number, actual data and error correction field; and a header portion including information identifying a number of data fields in the block, information identifying the length of the data fields, information identifying the length of the last data field, a block number, a continuation bit and an error correction field. The UWB transmissions may be adaptable according to link quality of the UWB transmission link by changing a length of the data fields in the transmission of subsequent blocks according to an evaluation of a current data block.

The UWB communications link may continuously transmits payload data, may be unidirectional, may provide for communications between two or more devices, and so forth.

The error control processing for the UWB communications link may be performed according to the error control data received via the other of the first and second communications link.

The second wireless communications link may a short-range communications link, such as a Bluetooth (BT) communications link, and/or may communicate data at significantly lower data rates than the first wireless communications link.

In another embodiment, a method and system is provided to improve data throughput when performing error control in a mobile environment. The method and system provides a first wireless communications link and a second wireless communications link, and arranges the second wireless communications link to communicate error control data of the first wireless communications link. The first wireless communications link enables communication at a significantly higher data rate than the second wireless communications link.

The second wireless communications link may free the first wireless communications link from communicating bi-directional error control data overhead. The error control data may be Automatic Repeat Request (ARQ) data. The ARQ data may include Acknowledgement (ACK) data identifying a packet type, block number, sequence numbers and number of sequence numbers.

In another aspect, a computer-readable medium may be encoded with processing instructions for implementing the various method and functions herein, such as improving data throughput when performing error control in Ultra Wideband (UWB) communications or in a mobile environment, to be performed by a computerized system which can be embodied in wireless communications device.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein:

FIG. 6 is a diagram of an exemplary data packet;

DETAILED DESCRIPTION OF THE PREFERRED EMBODIMENTS

I. Operational Environment

Figure 1:
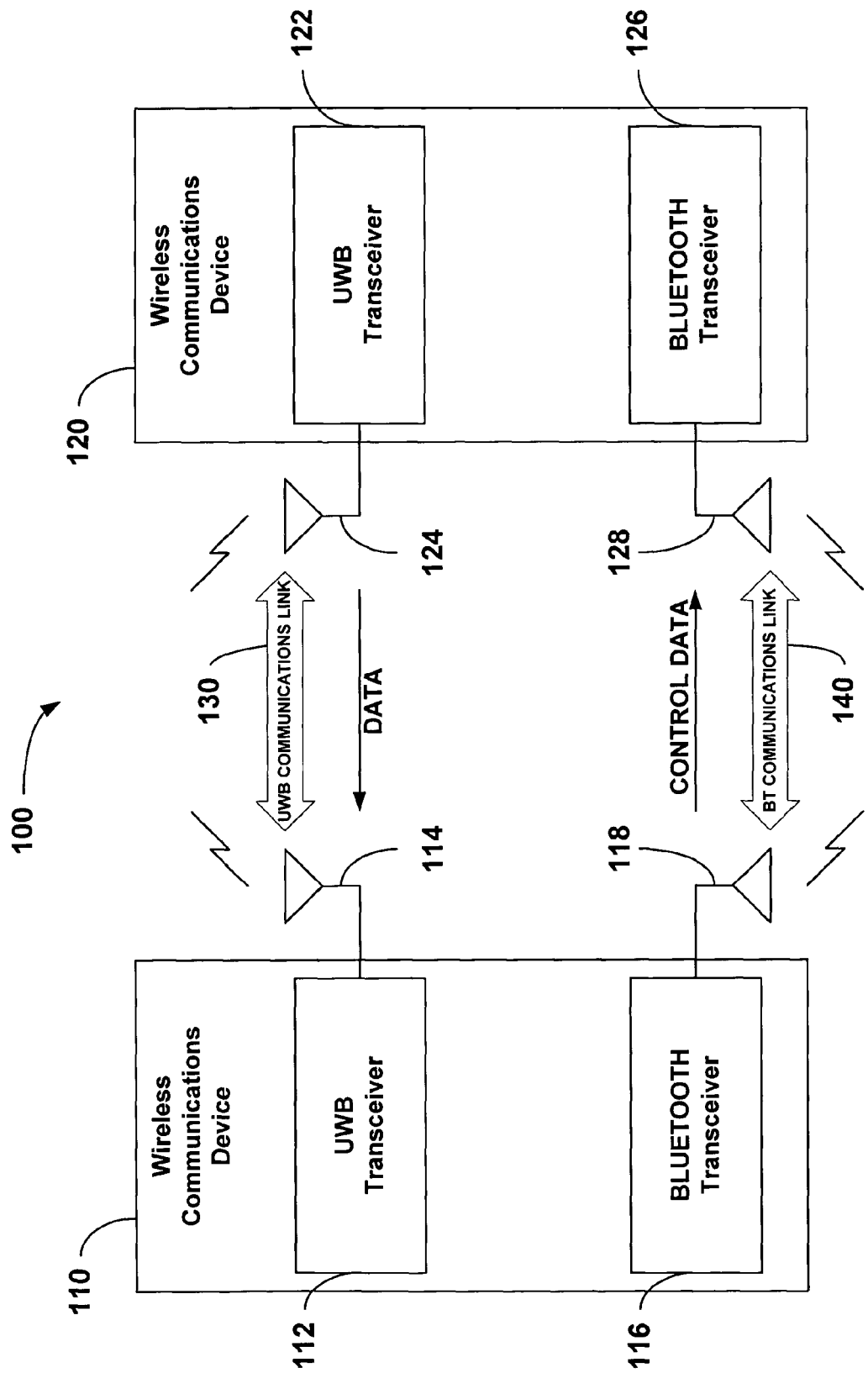
FIG. 1 is a diagram of an exemplary operational environment.

Before describing the invention in detail, it is helpful to describe an environment in which the invention may be used. Accordingly, FIG. 1 is a diagram of an operational environment which includes wireless communications devices 110 and 120.

Devices 110 and 120 are capable of engaging in wireless communications via at least two different types of short-range wireless links. For example, devices 110 and 120 may support both Bluetooth link(s) 140 and UWB link(s) 130. As shown in FIG. 1, device 110 may include a UWB transceiver 112 and antenna 114 and Bluetooth transceiver 116 and antenna 118; and device 120 may include a UWB transceiver 122 and antenna 124 and Bluetooth transceiver 126 and antenna 128. Other short range or long range wireless communications links may also be supported, such as Infra Red, WPAN, cellular, etc.

Devices 110 and 120 each have a communications range that is defined by a coverage area. In the environment of FIG. 1 devices 110 and 120 are within each other's communications ranges for performing both UWB and Bluetooth communications. Accordingly, a first wireless communications link 140 and a second wireless communications link 130 are established between devices 110 and 120. As discussed, these links may be of different types. For instance, first link 140 may be a Bluetooth link or channel (hereinafter Bluetooth link or BT link), while second link 130 may be a UWB link or channel (hereinafter UWB link).

According to an aspect of the present invention, first device 110 and second device 120 may communicate data, such as payload data, across second link(s) 130 and may communicate control data such as error control data for error control processing of the UWB communications across first link(s) 140. Such error control data may include, for example, retransmission control data employed in Automatic Repeat Request (ARQ) scheme or mechanism. Other types of data may also be communicated across first link(s) 140 as desired. Data communications across second link 130 may be unilateral or bilateral.

Although the above shows a communications implementation between two devices, the communications arrangement employing separate links or channels for transmitting data (e.g., payload data) and control data may be employed in communication between multiple devices, such as in a multicast environment. An example of a multicast environment which can be modified to employ the methods and systems herein is described in U.S. application Ser. No. 10/660,545, entitled "Method And System For Processing Acknowledgments In A Wireless Communications Network," filed on even date herewith. As discussed above, this application is incorporated herein by reference in its entirety. In a multicast environment, data may be transmitted via UWB transmissions to one or more remote systems and one or more BT links may be employed for communications of control data (for the UWB transmission) with these remote systems.

II. Wireless Communications Device

Figure 2:
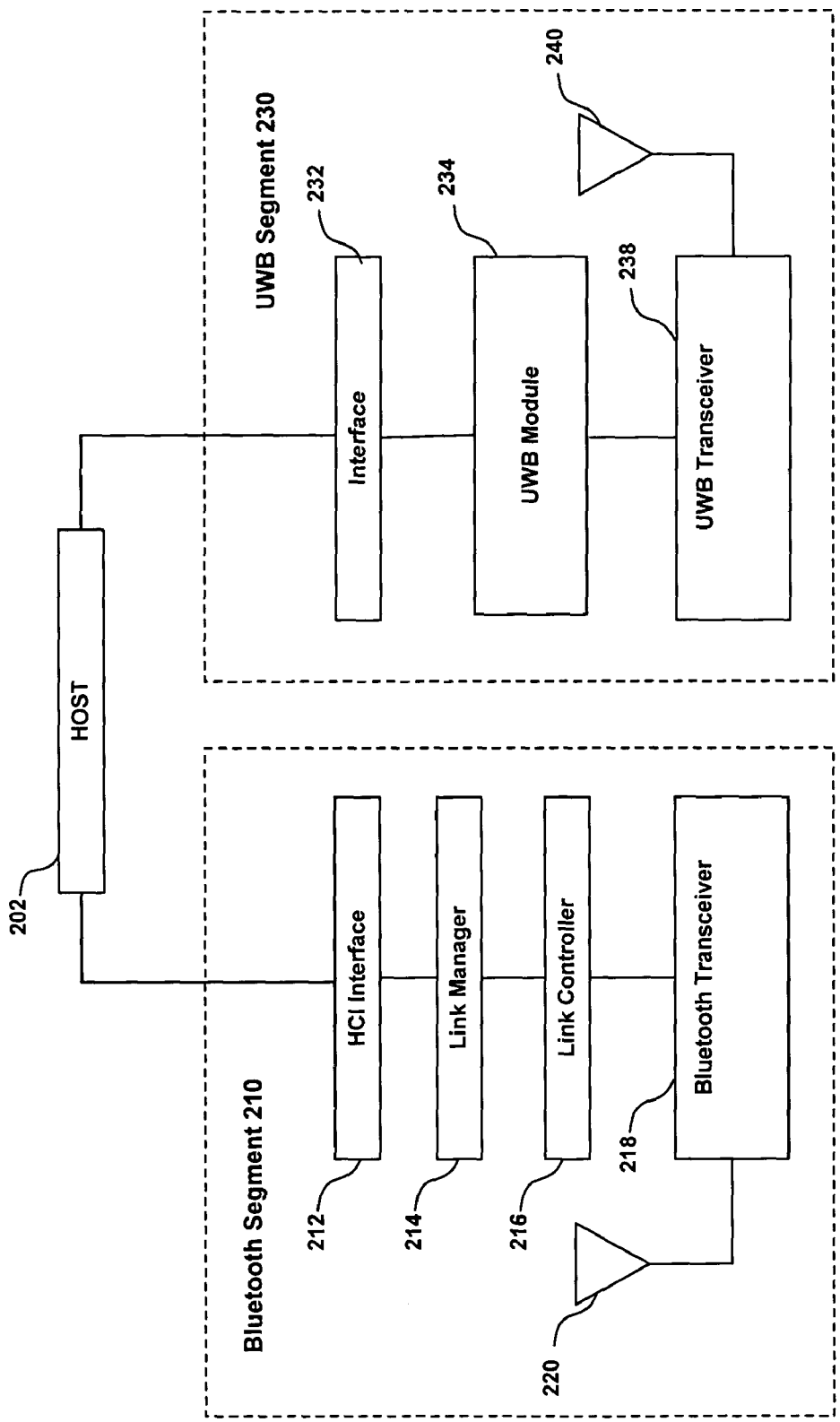
FIG. 2 is a block diagram of an exemplary communications device architecture.

FIG. 2 is a block diagram showing an example of a wireless communications device architecture, which may be used for devices 110 and 120. Although this architecture is described in the context of Bluetooth and UWB communications, it may be employed with other wireless communications technologies.

The device architecture of FIG. 2 includes a host 202, which is coupled to a Bluetooth segment 210, and a UWB segment 230. Host 202 is responsible for functions involving user applications and higher protocol layers, while Bluetooth segment 210 and UWB segment 230 are responsible for lower layer protocols. More particularly, Bluetooth segment 210 is responsible for Bluetooth specific communications with other devices, and UWB segment 230 is responsible for UWB specific communications with other devices.

Although UWB transmission may be employed to set up a UWB connection, another communications link or channel may be employed to establish a UWB connection. For example, Bluetooth segment 210 may be used to establish a UWB link without transmitting any UWB signals. Techniques for setting up such links are described in U.S. application Ser. No. 10/660,544, entitled "Method and System for Establishing a Wireless Communications Link," filed on even date herewith. As discussed above, this application is incorporated herein by reference in its entirety.

As shown in FIG. 2, Bluetooth segment 210 includes a host controller interface (HCI) 212, a link manager 214, a link controller 216, a Bluetooth transceiver 218, and an antenna 220.

Link manager 214 performs functions related to Bluetooth link set-up, security and control. These functions involve discovering corresponding link managers at remote devices and communicating with them according to a link manager protocol (LMP). To perform these functions, LMP defines a set of messages, which are also referred to as protocol data units (PDUs). Link manager 214 exchanges these PDUs with link managers at remote devices.

Link manager 214 exchanges information with host 202 across HCI 212. This information may include commands received from host 202, and information transmitted to host 202. HCI 212 defines a set of messages, which provide for this exchange of information.

Link controller 216 operates as an intermediary between link manager 214 and Bluetooth transceiver 218. Link controller 216 also performs baseband processing for Bluetooth transmission, such as error correction encoding and decoding. In addition, link controller 216 exchanges data between corresponding link controllers at remote devices according to physical layer protocols. Examples of such physical layer protocols include retransmission protocols such as the ARQ protocol.

FIG. 2 shows that Bluetooth transceiver 218 is coupled to an antenna 220. Transceiver 218 includes electronics that allow the device of FIG. 2 (in conjunction with antenna 220) to exchange wireless Bluetooth signals with devices, such as remote device 120. Such electronics include modulators and demodulators, amplifiers, and filters.

When the device of FIG. 2 engages in UWB communications, it employs the services of UWB segment 230. As shown in FIG. 2, UWB segment 230 includes a UWB module 234, a UWB transceiver 238, and an antenna 240.

UWB module 234 provides for the exchange of information across UWB links according to one or more protocol layers. For example, UWB module may provide session management functionality to manage various UWB sessions. In addition, UWB module 234 may perform baseband processing, such as error correction encoding and decoding. In addition, UWB module 234 perform various link level protocols with remote devices according to physical layer protocols. Examples of such protocols include retransmission protocols such as the automatic repeat request (ARQ) protocol.

UWB transceiver 238 is coupled to antenna 240. UWB transceiver 238 includes electronics, which allow the device of FIG. 2 (in conjunction with antenna 240) to exchange wireless UWB signals with devices, such as remote device 120. For the transmission of UWB signals, such electronics may include a pulse generator. For the reception of UWB signals, such electronics may include timing circuitry and filters.

Figure 3:
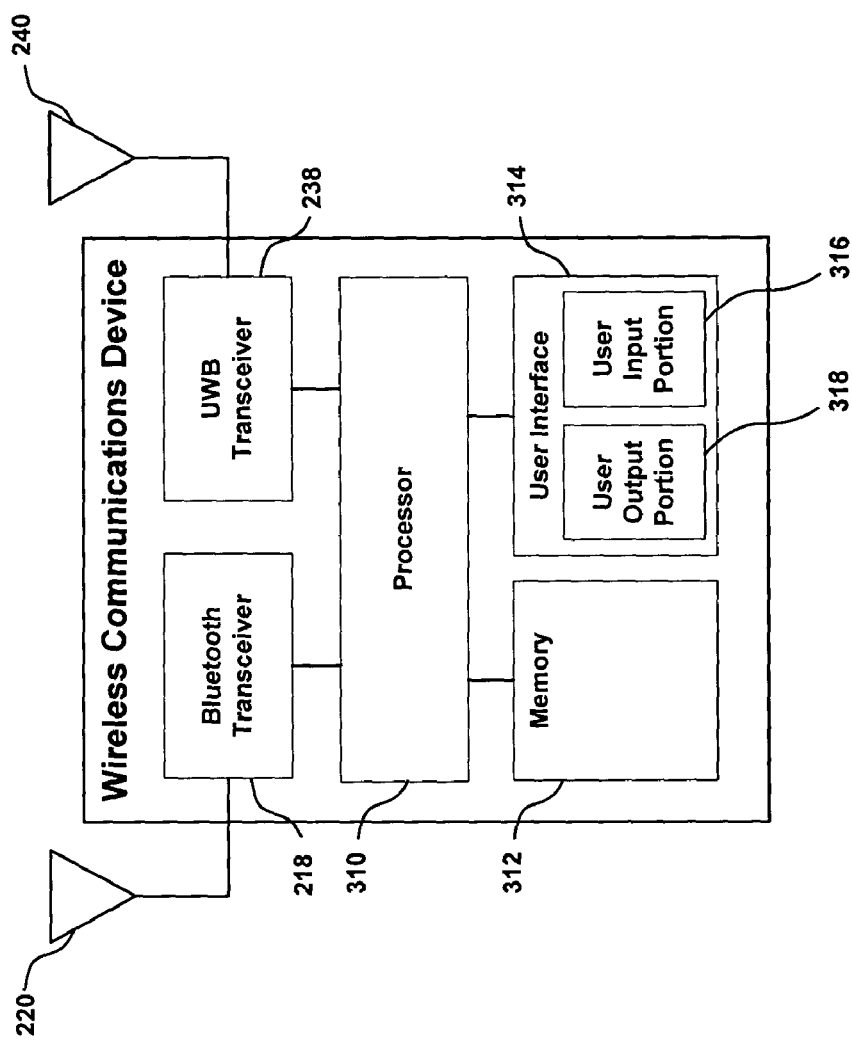
FIG. 3 is a block diagram of an exemplary communications device implementation.

The architecture of FIG. 2 may be implemented in hardware, software, firmware, or any combination thereof. One example of such implementation is shown in FIG. 3. This implementation includes a processor 310, a memory 312, and a user interface 314. In addition, the implementation of FIG. 3 includes Bluetooth transceiver 218, antenna 220, UWB transceiver 238 and antenna 240. Transceivers 218 and 238 may be implemented as described above with reference to FIG. 2.

As shown in FIG. 3, processor 310 is coupled to transceivers 218 and 238. Processor 310 controls device operation. Processor 310 may be implemented with one or more microprocessors that are each capable of executing software instructions stored in memory 312.

Memory 312 includes random access memory (RAM), read only memory (ROM), and/or flash memory, and stores information in the form of data and software components (also referred to herein as modules). These software components include instructions that can be executed by processor 310. Various types of software components may be stored in memory 312. For instance, memory 312 may store software components that control the operations of transceivers 218 and 238. Also, memory 312 may store software components that provide for the functionality of host 202, HCI interface 212, link manager 214, link controller 216, interface 232 and UWB module 234.

In addition, memory 312 may store software components that control the exchange of information through user interface 314. As shown in FIG. 3, user interface 314 is also coupled to processor 310. User interface 314 facilitates the exchange of information with a user. FIG. 3 shows that user interface 314 includes a user input portion 316 and a user output portion 318. User input portion 316 may include one or more devices that allow a user to input information. Examples of such devices include keypads, touch screens, and microphones. User output portion 318 allows a user to receive information from WCD 110. Thus, user output portion 318 may include various devices, such as a display, and one or more audio speakers. Exemplary displays include liquid crystal displays (LCDs), and video displays.

The elements shown in FIG. 3 may be coupled according to various techniques. One such technique involves coupling transceivers 218 and 238 processor 310, memory 312, and user interface 314 through one or more bus interfaces. In addition, each of these components is coupled to a power source, such as a removable and rechargeable battery pack (not shown).

III. Error Control/Retransmission Architecture

Figure 4:
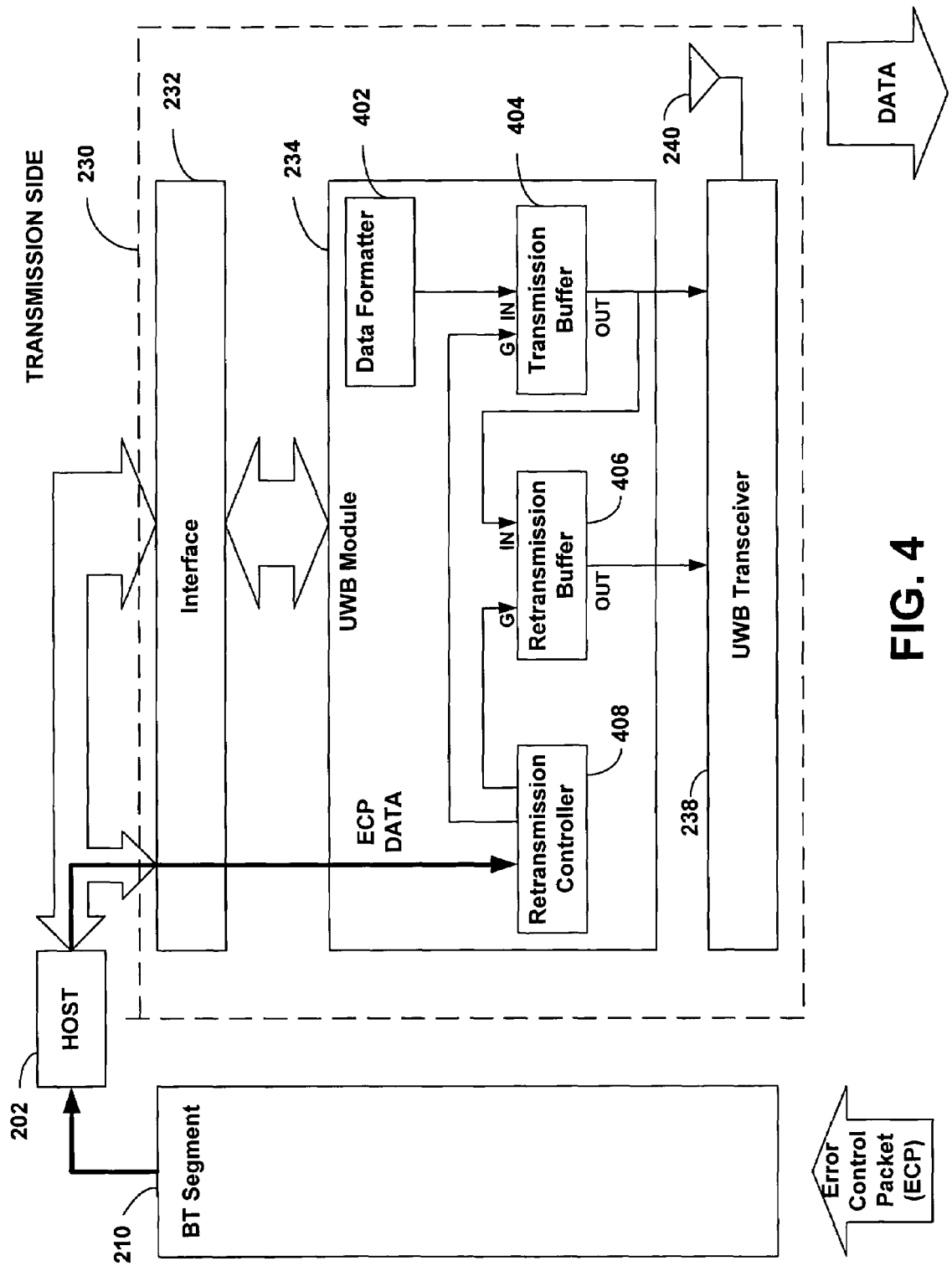
FIG. 4 is a block diagram of exemplary architecture of a communications device for performing data transmission with error control scheme or mechanism.

FIG. 4 is a block diagram of an exemplary transmission-side architecture of UWB segment 230 for performing data transmission and error control processing through retransmission with an error control scheme or mechanism, which may be used for devices 110 and 120. UWB segment 230 may be implemented in hardware, software, firmware, or any combination thereof.

As shown in FIG. 4, this implementation may include a UWB segment 230 which receives from BT Segment 210 error control data, such as an error control packet (ECP), for use in error control processing for the UWB link. The error control data is thereafter provided to the UWB segment 230. Although this example shows the error control data being directed or routed across host 202, such control data as well as other data may be communicated between BT and UWB facilities, as desired.

In order to route or direct data intended for UWB segment 230 from BT segment 210, the data received from BT link may have associated therewith some identifier to facilitate provision thereof to the UWB segment 230 for error control processing or other control processing. One example may be to employ the connection handle (e.g., connHandle number or parameter) of the particular BT link (upon which error control data is communicated) as such an identifier. Thus, the received data via Bluetooth transmission is marked with a particular connection handle and, accordingly, is provided to UWB segment 230 for processing. Other techniques for discriminating data (from BT transmission) for provision to UWB segment 230 may also be employed. For example, the header information or data in the packet may be modified or encoded to identify the destination or type of data being sent to facilitate routing of data to UWB facility of the wireless communications device.

Turning back to FIG. 4, UWB segment 230 may include an interface 232, a UWB module 234, transceiver 238 and antenna(s) 240 for performing communications via UWB link. In general, UWB segment 230 receives the error control data from the BT segment 210 and performs error control processing accordingly, e.g., controls transmission and retransmission of data for the UWB link based on the error control data.

UWB module 234 may include a UWB link manager and a UWB link/baseband controller to implement UWB communications. UWB link manager may perform functions related to security, and session management. In addition, UWB link manager may receive and process data for transmission to remote devices. Such data may be received from host 202 via interface 232. Once processed, this data is sent to link or baseband controller as transmission data.

To perform data transmission and error control processing, UWB module 234 may also include a data formatter 402, a retransmission controller 408, a retransmission buffer 406, and a transmission buffer 404, all of which may reside in the link or baseband controller facility.

Data formatter 402 receives transmission data and places it in a format for transmission to one or more remote devices (e.g., device 110). This may include placing transmission data into one or more packets, each having a header portion and a data portion. The header portion may include overhead information, such as a packet sequence number as well as a cyclical redundancy check (CRC), other form of error correction coding, or other data for use in conducting communications. Accordingly, data formatter 402 may compute appropriate error correction codes. An example of such a data packet is discussed below with reference to FIG. 6.

Data packets are then sent to transmission buffer 404 to await transmission. As shown in FIG. 4, transmission buffer 612 includes an input port (labeled "IN"), an output port (labeled "OUT"), and a gate port (labeled "G"). Transmission buffer 404 receives data packets and stores them in memory. Transmission buffer 404 outputs a stored packet when it receives signal at its gate port. Transmission buffer 404 may store and output packet in a first-in, first-out (FIFO) manner or selectively, as desired.

UWB transceiver 238 receives output packet and sends it to remote devices (e.g., devices 110) as a UWB transmission via antenna 240.

Data packet is also sent to retransmission buffer 406 which stores the most recently transmitted packet. As shown in FIG. 4, retransmission buffer 406 includes an input port (labeled "IN"), an output port (labeled "OUT"), and a gate port (labeled "G"). Retransmission buffer 406 outputs stored packet(s) as retransmission packet when it receives signal at its gate port. Retransmission buffer 406 may store a single packet or multiple packets or remove stored packet(s) depending on the retransmission scheme or mechanism.

UWB transceiver 238 receives retransmission packet(s) and sends it to remote devices (e.g., device 110) as a UWB retransmission.

As described above, transmissions and retransmissions may be initiated by signals from retransmission controller 408 or the like to transmission buffer 404 or retransmission buffer 406. Retransmission controller 408 receives error control data for UWB communications from the BT link and controls such transmission and retransmission accordingly. Various retransmission schemes or mechanisms may be employed in conjunction with the method and system herein to address transmission errors across the UWB link. One such approach is ARQ which employs feedback control to request, actively or passively, retransmission of corrupted data. Accordingly, the error control data may be an Acknowledgment (ACK) or Non-Acknowledgment (NAK) depending on the ARQ scheme or mechanism. An example of an ACK packet is discussed further below with reference to FIG. 7.

Examples of various ARQ schemes or mechanisms may include Stop and Wait ARQ, Go-Back-N ARQ, Selective Repeat ARQ, Hybrid ARQ such as type II hybrid ARQ and so forth.

The Stop and Wait ARQ scheme, in general, involves the receiver sending an ACK signal to acknowledge a correct reception and a NAK signal to request a retransmission of data where an error was detected (e.g., corrupted data or non-receipt of data).

The Go-Back-N ARQ scheme, in general, involves continuous transmission of data by a transmitting side. In the event a NAK signal is received by the transmission side, the transmission side goes back by N data packets or blocks and restarts transmission of the N data packets or blocks.

The Selective Repeat ARQ scheme also involves continuous transmission of data by a transmitting side, but only the data block or packet in error is retransmitted such as upon receipt of a NAK.

The Hybrid type II ARQ involves a combination of an ARQ scheme and a forward error correction (FEC) scheme. In this system, a data block is transmitted at first in a heavily punctured way, and in the event of retransmission, the punctured bits are transmitted.

The above are simply a few examples of the retransmission scheme or mechanism which may be employed in the method and system herein. Other error control processing schemes and mechanisms may also be employed so that transmission of control data is performed on a separate or different communications link or channel from the data link or channel upon which data (e.g., payload data) is communicated.

Figure 5:
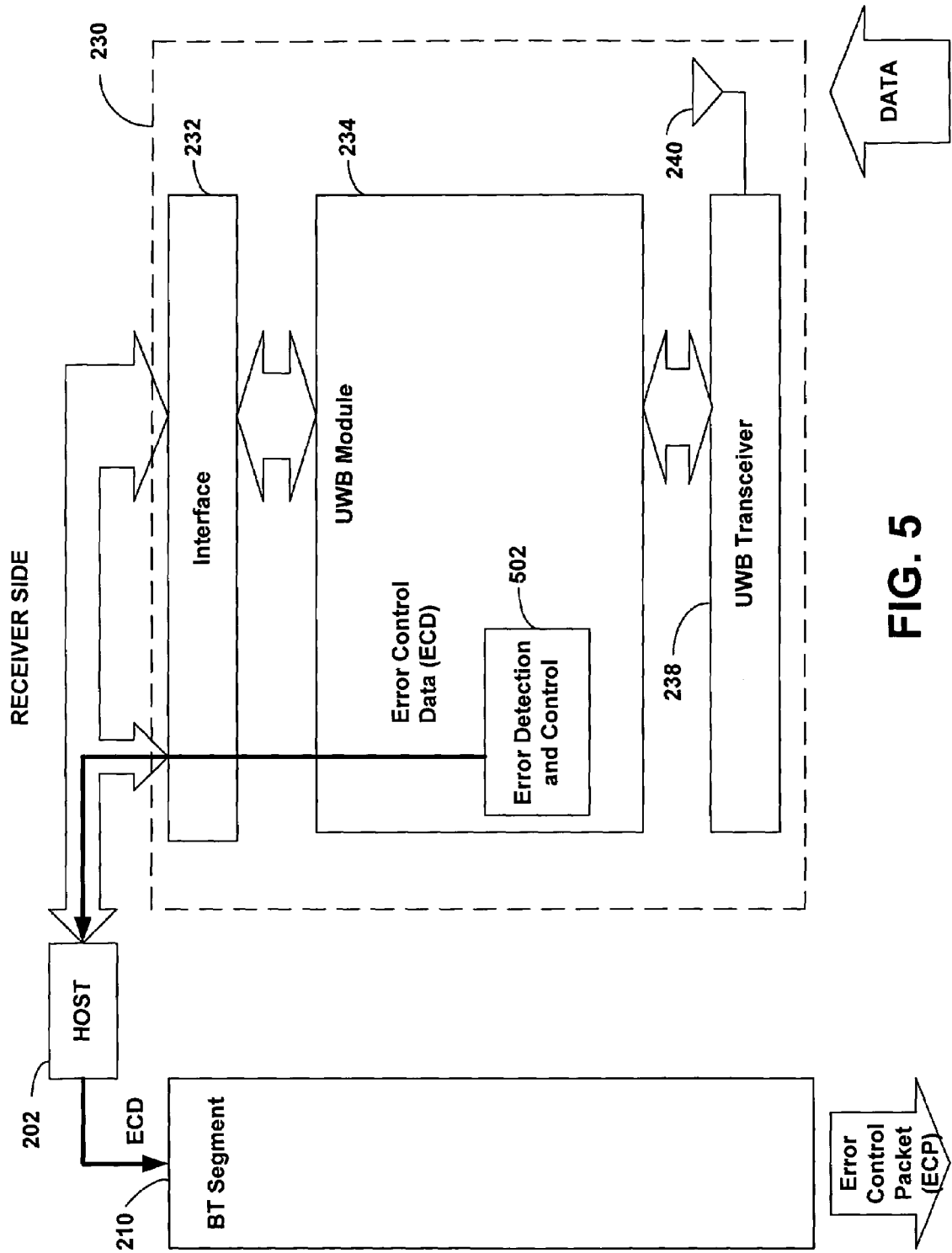
FIG. 5 is a block diagram of exemplary architecture of a communications device for performing data reception with error control scheme or mechanism.

FIG. 5 is a block diagram of exemplary reception-side architecture of a UWB segment 230 for performing data reception with error control scheme or mechanism through retransmission with an error control scheme or mechanism, which may be used for devices 110 and 120. UWB segment 230 may be implemented in hardware, software, firmware, or any combination thereof.

As shown in FIG. 5, UWB segment 230 receives data via UWB link, performs error detection on the received data and generates error control data accordingly. Error control data (ECD) is provided to BT segment 210, across host 202, and is transmitted to the data transmission side across BT link as error control packet (ECP) containing the ECD.

UWB segment 230 includes an interface 232 for communicating with host 202, UWB module 234, UWB transceiver and antenna(s) 240. The various components and functionality of UWB segment 230 are similar to those shown and discussed above for FIG. 4, except that UWB Module 230 includes receiver side components, such as an error detection and control module 502 and other data processing sub-modules for processing and decoding received data. Module 502 performs error detection on the received data packet(s) from UWB link and generates an ECD depending on the error control scheme implemented. For example, as discussed above with respect to FIG. 4, the error control scheme or mechanism may be an ARQ implementation where the ECD may be an ACK or NAK. The ECD may be transmitted from the appropriate BT link, such as defined by a particular connHandle, to the BT facility of the data transmission side and processed accordingly to control transmission or retransmission of data across the UWB link. The ECP is marked appropriately with an identifier, such as the connection handle, so that the receiving side can provide or route the error control data to its UWB facility for appropriate processing.

Error detection and control module 502 may employ various error detection techniques on received data. Examples of error detection techniques may include the checking of a cyclic redundant code (CRC) provided with payload data or other data, checking for parity, checking a Check Sum or the like, checking the length or other known attributes of the data packet to ascertain the occurrence of any error, checking whether the data received coincides with header information of the data packet, and so forth. The above are simply a few examples of error detection techniques which may be employed with the method and system herein.

IV. Exemplary Data Packets

In one exemplary implementation, during UWB transmission session, the data field lengths (except the last data field) may be constant. Link adaptation by changing data field length can be implemented if the whole transmitted data is divided into several blocks which all have the Info Field in the beginning and number of data fields inside. The existence of more data blocks can be indicated by the continuation bit(s) in the Info Field, and each block can be identified by Block Number (BN) which can be combined with sequence numbers when identifying the data fields. An example of such is shown by reference to data packet 600 of FIG. 6.

FIG. 6 is a diagram of an exemplary data packet 600 communicated across wireless link, such as UWB link. Data packet 600 may contain various information or fields of data, such as an information field (Info Field), and one or more Sequence Numbers (SN) along with their associated Data field and CRC.

The Info Field may include information identifying the number of data fields, length of the data fields, length of the last data field, a continuation bit(s) identifying the existence of additional data blocks, a block number (BN) or additional information for use in error detection or correction or identifying attributes of the communicated data to provide for greater flexibility in data communications across the communications link or channel. The Info Field may also include a CRC. The various types of information in data packet 600 and Info Field are self explanatory and will not be discussed in any further detail.

In an aspect of the method and system herein, an ARQ mechanism may be based on fragmenting the data in UWB communications into smaller fields of data, which are identified by SN and checked by CRC or other error control code, such as shown in data packet 600. Harmonizing the length of SN, data field and CRC affects the speed and reliability of the wireless communications device. Although the entire transmission may be from a smaller amount up to Gigabytes of data, the data fields could also vary in size. The longer the data fields are, the lesser the overhead is needed for SN. However, longer packets are more susceptible against error. It is desirable to feasibly maintain the strength of the CRC.

In order for a receiving side (e.g., receiver) to handle the length of the data fields, sequence numbers and CRC correctly, the receiving side should have knowledge of their lengths or attributes. Various approaches may be employed to ensure correct handling of such information. For example, the lengths may be predefined constants, the lengths may be predefined in link setup phase in Bluetooth messages, or the lengths may be informed by the transmitting side in the beginning of the transmission such as via the Info Field of data packet 600.

The lengths of data fields may be determined based on various factors, such as to maintain feasible CRC strength (as discussed above) or according to link or channel quality (e.g., QoS) or according to application (e.g., downloading data, business transaction, etc.) or so forth. The UWB link may provide for an adaptable or dynamic transmissions which may change according to link quality. In one such transmission example, the length of the data fields in the transmission of subsequent blocks may be changed according to an evaluation of a current data block.

Irrespective of the above approach, the number of data fields during UWB transmission session and the length of the last data field (which may be of a different length) may be informed to the receiving side. This information may be provided or added at the beginning of the UWB transmission such as in the Info Field of data packet 600 or delivered via Bluetooth link beforehand.

Figure 7:
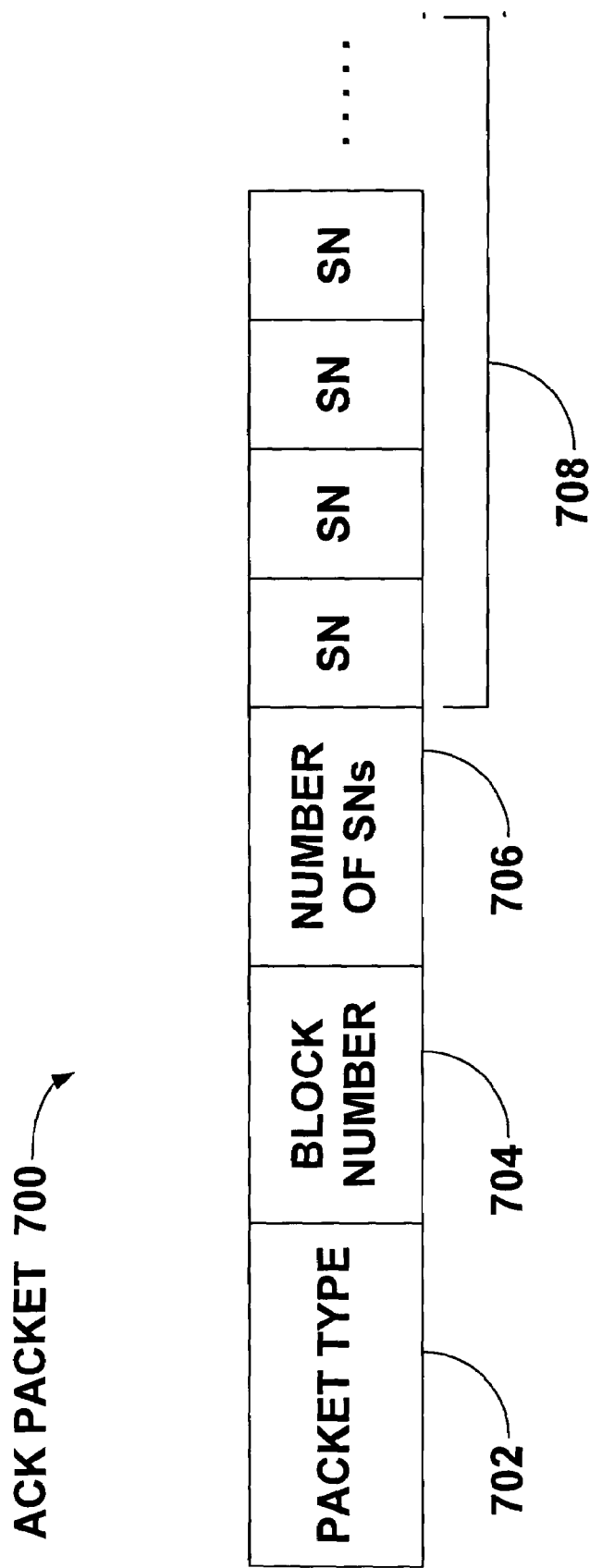
FIG. 7 is a diagram of an exemplary Acknowledgment (ACK) packet.

FIG. 7 is a diagram of an exemplary Acknowledgment (ACK) packet 700. As shown, ACK packet 700 may include information, such as a packet type 702 indicating whether the packet contains data or control data and the type of control (e.g., which kind of control), block number (BN) 740 indicating the number of blocks, number of sequence numbers (SNs) 706 and one or more sequence numbers 708 indicating received packets in a receiving order (not necessarily subsequent numbers because of possible retransmission). ACK packet 700 may include varying amounts of SNs.

In accordance with one aspect of the method and system herein, the acknowledgments may be delivered via a first link (e.g., Bluetooth link) from the UWB facility of the receiving side to the UWB transmitting side. The ACK packet may be configured appropriately depending on the retransmission scheme or mechanisms, such as those ARQ schemes or mechanisms discussed above.

V. Error Control Implementation

Figure 8:
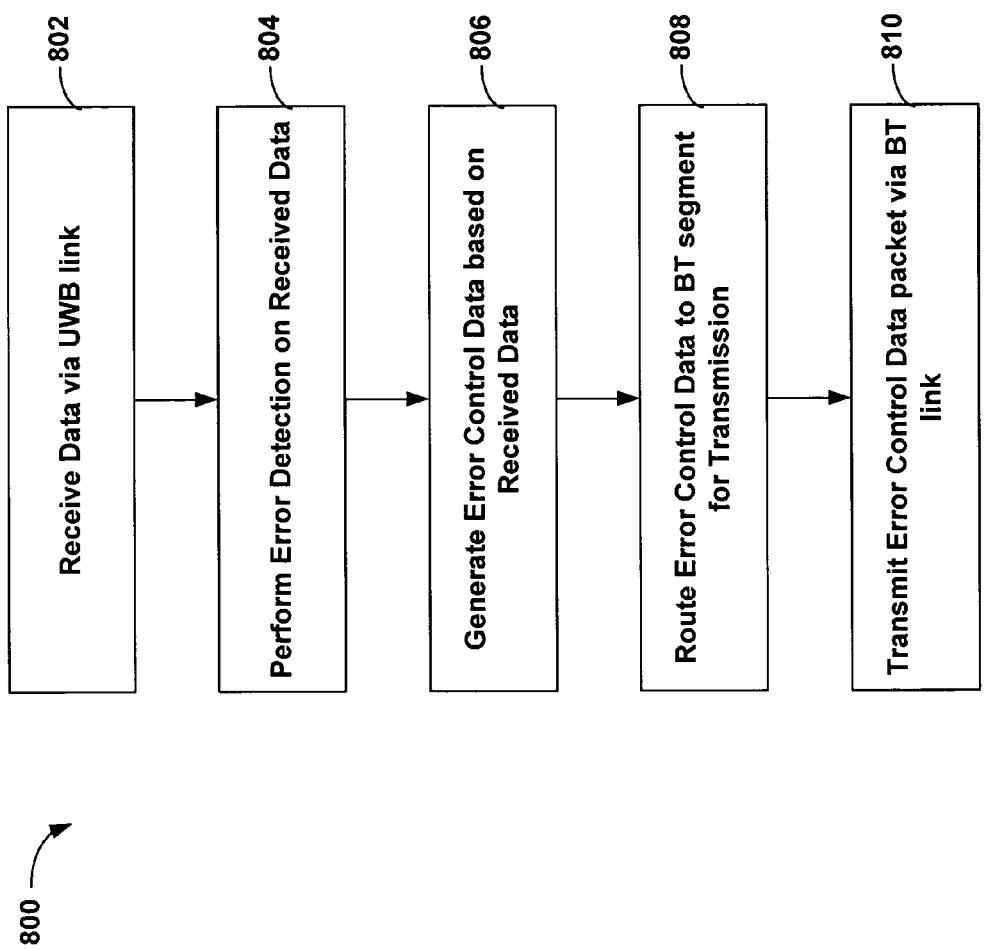
FIG. 8 is a flowchart of an exemplary process by which error control data is provided to the transmission side.

FIG. 8 is a flowchart of an exemplary process 800 by which error control data for data UWB transmission is provided to the transmitting side by the receiving side via another transmission link, such as a BT link, between the two sides. In this example, the transmitting side (e.g., device 120) refers to a device, node or party transmitting data, such as payload data and the receiving side (e.g., 110) refers to a device, node or party receiving data, such as payload data.

The process 800 begins at step 802 in which the receiving side receives data from the transmission side, via UWB link. At steps 804 and 806, the receiving side performs error detection on the received data and generates error control data based on evaluation of the received data (or non-receipt thereof). As discussed above, various error detection techniques may be employed such as checking a CRC and so forth, and error control data may be ARQ data such as an ACK or NAK. The generation of such data, including the type (e.g., ACK or NAK) to be generated, frequency of generation and content of the data, is dependent on the ARQ scheme or mechanism.

At steps 808 and 810, the generated error control data marked with an identifier such as a particular connection handle and is transmitted to the transmitting side via the BT link. As discussed above, the identifier facilities routing the control data to the UWB facility on the transmitting side.

Figure 9:
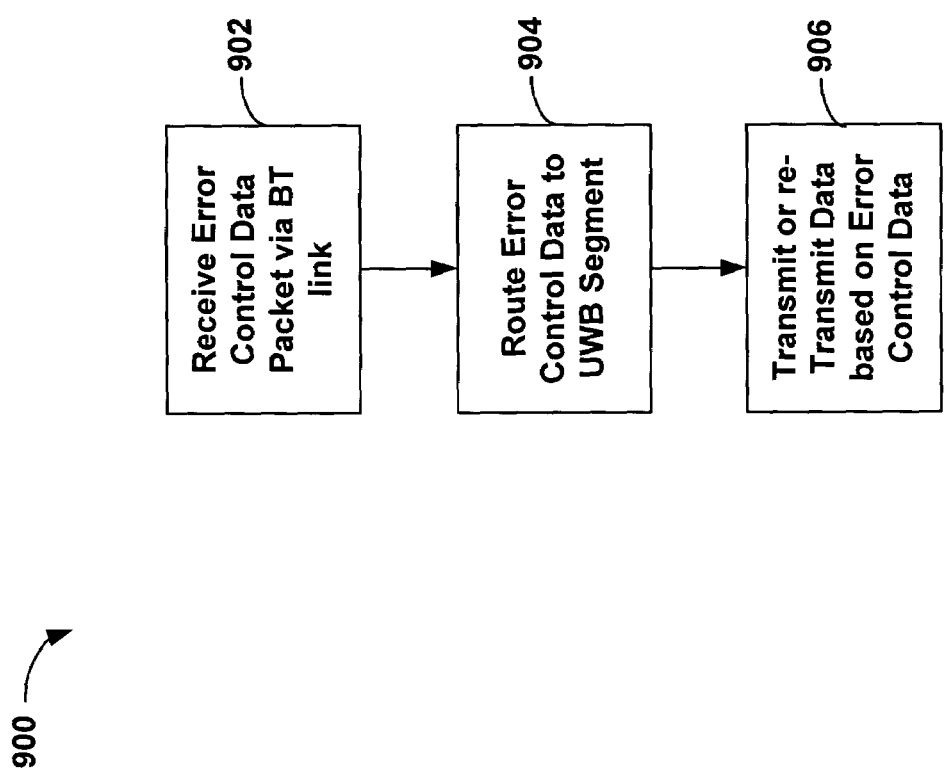
FIG. 9 is a flowchart of an exemplary process by which data is transmitted or retransmitted based on error control data.

FIG. 9 is a flowchart of an exemplary process 900 by which data is transmitted or retransmitted via UWB link from the transmitting side based on error control data received from the receiving side via BT link. In this example, the transmitting side (e.g., device 120) refers to a device, node or party transmitting data, such as payload data and the receiving side (e.g., 110) refers to a device, node or party receiving data, such as payload data.

The process 900 begins at step 902 in which the transmitting side receives error control data packet from the receiving side via the BT link. At step 904, the error control data is routed to the UWB facility of the transmitting side. Such routing may entail performing identification on incoming data on the BT link(s) to ascertain their destination, e.g., identifying the connection handle or other identifier designating the received packet for routing to UWB facility.

At step 906, the transmitting side transmits or retransmits data to the receiving side via the UWB link based on error control data (or non-receipt thereof). Various retransmission schemes or mechanisms may be employed as desired.

Figure 10:
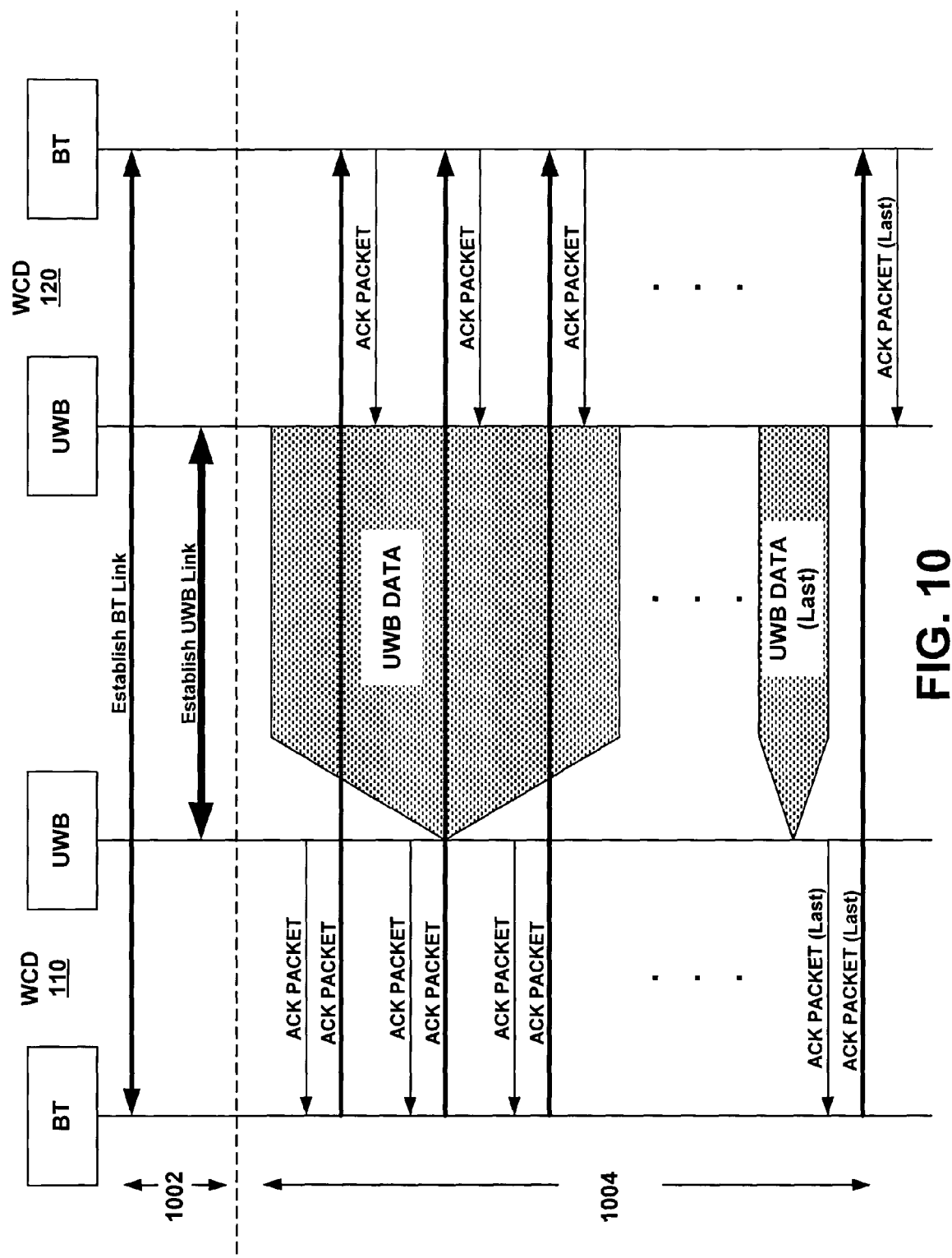
FIG. 10 is a diagram of exemplary interactions between two devices in performing data communications.

FIG. 10 is a diagram of interactions between two devices in performing communications using UWB link to communicate data and BT link to communicate error control data for the UWB link in a communications session. In this example, WCD 110 and WCD 120 both include BT and UWB facilities to perform BT and UWB communications with each other, and communicate UWB data transmission and ACK packets through a unidirectional or unilateral UWB and Bluetooth transmission, respectively.

As shown in FIG. 10, in an initial period 1002, WCD 110 and WCD 120 establish communications links therebetween, such as a BT link and UWB link. Other processes may also be performed such as authentication and configuration of the desired error control scheme, such as an ARQ scheme.

In the period designated by 1004, WCD 110 and WCD 120 perform data communications and error control communications in the form of ARQ data such as ACK packet. WCD 120 transmits data (e.g., payload data) across the UWB link to WCD 110. To improve data transmission rate across the UWB link, the transmission across the UWB link may be maintained in a unilateral direction, e.g., from WCD 120 to WCD 110, with the ARQ data for the UWB transmission being transmitted across the BT link from WCD 110 to WCD 120. The transmission across the BT link may also be maintained in a unilateral direction, e.g., from WCD 110 to WCD 120.

In regard to the error control data, the receiving side WCD 110 generates and forwards the ACK packet from its UWB facility to its BT facility which transmits the ACK packet to the BT facility of the transmitting side WCD 120. The ACK packet is then provided or routed from the BT facility to the UWB facility of WCD 120, and transmission or retransmission is performed accordingly depending on the ARQ scheme or mechanism.

In this transmission session example, the last ACK is sent from WCD 110 to WCD 120 after the last data packets have been sent by WCD 120 via the UWB link. Thus, the UWB facility, such as the UWB transmitter module, must be kept on until the last ACK is received. Otherwise the UWB transmitter module is woken up again if the module was switched off and not all the expected ACKs were received (in time).

The above interaction is simply a non-limiting example of a interaction between devices employing unilateral links to improve transmission rate. The method and system herein may be employed in the context of other interactions, such as those involving bilateral or multipath communications across UWB link(s) and BT link(s), or other error control processing.

VI. Fast Copy with Error Control Processing

In another aspect of the present invention, a Fast Copy architecture is provided which employs a memory stick with UWB transceiver to provide high speed download or transfer of data. The Fast Copy architecture employing UWB transmissions is described in U.S. application Ser. No. 10/660,634, entitled "Ultra-Wideband/Low Power Communication Having A Dedicated Memory Stick For Fast Data Downloads— Systems, Methods And Program Products," filed on even date herewith. As discussed above, this application is incorporated herein by reference in its entirety.

To ensure high, reliable data transmission in the Fast Copy architecture, an error control scheme or mechanism may be implemented such as ARQ scheme or mechanism, particularly since UWB employs very low $T_X$ power radio which may require frequent retransmission. However, employing an ARQ scheme via UWB would reduce the available bit rate for UWB data transmissions.

Accordingly, the present method and system herein may be implemented with the Fast Copy architecture to provide for improved high, reliable data transfer via UWB radio. For example, the UWB link or radio is employed for data transmissions, such as unidirectional data transmission. Another type of link, such as BT link or radio, is employed as the UWB control channel for transmission of control traffic for the UWB radio.

VII. Conclusion

While various embodiments of the present invention have been described above, it should be understood that they have been presented by way of example only, and not in limitation. For instance, although examples have been described involving Bluetooth and UWB technologies, other short-range and longer range communications technologies are within the scope of the present invention. Although error correction schemes have been described involving ARQ, other error correction schemes or mechanisms are also within the scope of the present invention.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method, comprising:
providing a first wireless communications link;
providing a second wireless communications link;
wherein the first wireless communications link is a ultra wideband (UWB) transmission link for transmitting payload data, and the second wireless communications link is a different type of wireless communications link for communicating error control data for the ultra wideband (UWB) transmission link without communicating payload data.

2. The method according to claim 1, wherein the error control data is Automatic Repeat Request (ARQ) data.

3. The method according to claim 2, wherein the ARQ data includes Acknowledgement (ACK) data identifying a packet type, block number, sequence numbers and number of sequence numbers.

4. The method according to claim 1, wherein the ultra wideband (UWB) communications link continuously transmits payload data.

5. The method according to claim 1, wherein the UWB data transmission is divided into at least one block comprising:
(a) at least one data field including a sequence number, actual data and error correction field; and
(b) a header portion including information identifying a number of data fields in the block, information identifying the length of the data fields, information identifying the length of the last data field, a block number, a continuation bit and an error correction field.

6. The method according to claim 5 wherein UWB transmissions is adaptable according to link quality of the UWB transmission link by changing a length of the data fields in the transmission of subsequent blocks according to an evaluation of a current data block.

7. The method according to claim 1, wherein the UWB communications link is unidirectional.

8. The method according to claim 1, further comprising performing error control processing for the UWB communications link according to the error control data received via the second wireless communications link.

9. The method according to claim 1, wherein the second wireless communications link communicates data at significantly lower data transfer rates than the UWB transmission link.

10. The method according to claim 1, wherein the second wireless communications link is a short-range communications link.

11. The method according to claim 10, wherein the second wireless short-range communications link is a Bluetooth (BT) communications link.

12. The method according to claim 1, wherein the UWB communications link provides for communications between two or more devices.

13. The method according to claim 1, wherein the providing of the first wireless communications link includes establishing the first wireless communications link, and the providing of the second wireless communications link includes establishing the second wireless communications link.

14. The method according to claim 1, wherein a payload transmission across the UWB transmission link is arranged based on the error control data received across the second wireless communication link.

15. A method according to claim 1, wherein the error control data comprises indications whether fragmented portions of the transmitted payload data needs to be retransmitted or not.

16. A system comprising:
first communications module for performing wireless communications via a first communications link;
second communications module for performing wireless communications via a second communications link;
wherein the first wireless communications link for transmitting payload data is a ultra wideband (UWB) transmission link for communicating data at very high data transfer rates, and the second wireless communications link is a different type of wireless communications link for communicating error control data for the ultra wideband (UWB) transmission link without communicating payload data.

17. The system according to claim 16, wherein the error control data is Automatic Repeat Request (ARQ) data.

18. The system according to claim 17, wherein the ARQ data includes Acknowledgement (ACK) data identifying a packet type, block number, sequence numbers and number of sequence numbers.

19. The system according to claim 16, wherein the UWB communications link continuously transmits payload data.

20. The system according to claim 16, wherein the UWB communications link is unidirectional.

21. The system according to claim 16, wherein the first communications module performing communications across the UWB link performs error control processing for the UWB communications link according to the error control data received via the second wireless communications link.

22. The system according to claim 16, wherein the second communication module performing communications across the second wireless communications link communicates data at significantly lower data transfer rates than the first communications module performing communications across the UWB link.

23. The system according to claim 16, wherein the second wireless communications link is a short-range communications link.

24. The system according to claim 23, wherein the second wireless short-range communications link is a Bluetooth (BT) communications link.

25. The system according to claim 16, wherein the UWB communications link provides for communications between two or more devices.

26. The method according to claim 16, wherein at least one of the first and second communications modules includes a link manager sub-module for establishing the first and second wireless communications links.

27. The system according to claim 16, wherein a payload transmission across the UWB transmission link is arranged based on the error control data received across the second wireless communication link.

28. A system according to claim 16, wherein the error control data comprises indications whether fragmented portions of the transmitted payload data needs to be retransmitted or not.

29. The system according to claim 16, wherein the second communications link is dedicated solely to communicate error control data for the first communications link, the error control data being received by the second communications module and routed to the first communications module to perform error correction on the communications of payload data on the first communications link.

30. A system comprising:
means for providing a first wireless communications link;
means for providing a second wireless communications link;

wherein the first wireless communications link for transmitting payload data is a ultra wideband (UWB) transmission link for communicating data at very high data transfer rates, and the second wireless communications link is a different type of wireless communications link for communicating error control data for the ultra wideband (UWB) transmission link without communicating payload data.

31. The system according to claim 30, wherein a payload transmission across the UWB transmission link is arranged based on the error control data received across the second wireless communication link.

32. A system according to claim 30, wherein the error control data comprises indications whether fragmented portions of the transmitted payload data needs to be retransmitted or not.

33. A computer-readable medium encoded with processing instructions for implementing a method performed by a wireless communications device, the method comprising:
providing a first wireless communications link;
providing a second wireless communications link;
wherein the first communications link is a ultra wideband (UWB) transmission link for communicating payload data at very high data transfer rates, and the second wireless communications link is a different type of wireless communications link for communicating error control data for the ultra wideband (UWB) transmission link without communicating payload data.

34. The computer-readable medium according to claim 33, wherein a payload transmission across the UWB transmission link is arranged based on the error control data received across the second wireless communication link.

35. A computer-readable medium according to claim 33, wherein the error control data comprises indications whether fragmented portions of the transmitted payload data needs to be retransmitted or not.

36. A method comprising:
providing a first wireless communications link;
providing a second wireless communications link;
arranging the first wireless communications link to communicate payload data, wherein the first communication link is an ultra wide band transmission link; and
arranging the second wireless communications link, which is different from the first communications link, to communicate error control data of the first wireless communications link without communicating payload data,
wherein the first wireless communications link enables communication at a significantly higher data rate than the second wireless communications link.

37. The method according to claim 36, wherein the second wireless communications link frees the first wireless communications link from communicating bi-directional error control data overhead.

38. The method according to claim 36, wherein the error control data is Automatic Repeat Request (ARQ) data.

39. The method according to claim 38, wherein the ARQ data includes Acknowledgement (ACK) data identifying a packet type, block number, sequence numbers and number of sequence numbers.

40. The method according to claim 36, wherein the first wireless communications link is a UWB communications link.

41. The method according to claim 36, wherein a payload transmission across the UWB transmission link is arranged based on the error control data received across the second wireless communication link.

42. A method according to claim 36, wherein the error control data comprises indications whether fragmented portions of the transmitted payload data needs to be retransmitted or not.

43. An apparatus comprising:
a first communications module for performing wireless communications via a first communications link; and
a second communications module for performing wireless communications via a second communications link,
wherein the first wireless communications link for communicating payload data is a ultra wideband (UWB) transmission link, and the second wireless communications link is a different type of wireless communications link for communicating error control data for the ultra wideband (UWB) transmission link without communicating payload data.

44. The apparatus according to claim 43, wherein the first communications module transmits payload data.

45. The apparatus according to claim 43, wherein the first communications module receives payload data.

46. The apparatus according to claim 43, wherein the second communications module includes an interface for providing the error control data.

47. The apparatus according to claim 43, wherein the second communications module includes an interface for obtaining the error control data.

48. An apparatus according to claim 43, wherein the error control data comprises indications whether fragmented portions of the transmitted payload data needs to be retransmitted or not.

49. An apparatus comprising:
a first communications module for transmitting payload transmission via a first communications link, wherein the first communication link is an ultra wide band transmission link; and
a second communications module for receiving error control data for the first communications link via a second communications link, which is different from the first communications link and does not communicate payload data,
wherein the payload transmission across the first communications link is arranged based on the error control data received across the second wireless communication link.

50. An apparatus according to claim 49, wherein the error control data comprises indications whether fragmented portions of the transmitted payload data needs to be retransmitted or not.

51. An apparatus comprising:
a first communications module for receiving payload transmission via a first communications link, wherein the first communication link is an ultra wide band transmission link; and
a second communications module for transmitting error control data for the first communications link via a second communications link, which is different from the first communications link and does not communicate payload data,
wherein the payload transmission across the first communications link is arranged based on the error control data received across the second wireless communication link.

52. An apparatus according to claim 51, wherein the error control data comprises indications whether fragmented portions of the transmitted payload data needs to be retransmitted or not.

* * * * *